United States Patent
Kim et al.

(10) Patent No.: US 7,301,970 B2
(45) Date of Patent: Nov. 27, 2007

(54) APPARATUS FOR EXECUTING MULTI-POINT CONTROL PROTOCOL IN ETHERNET PASSIVE OPTICAL NETWORK

(75) Inventors: Chan Kim, Daejeon (KR); Ho Sook Lee, Jeonju (KR); Tae Whan Yoo, Daejeon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 908 days.

(21) Appl. No.: 10/629,889

(22) Filed: Jul. 29, 2003

(65) Prior Publication Data

US 2004/0109688 A1 Jun. 10, 2004

(30) Foreign Application Priority Data

Dec. 10, 2002 (KR) .................. 10-2002-0078147

(51) Int. Cl.
*H04J 3/04* (2006.01)
(52) U.S. Cl. .................. 370/535; 370/536; 370/537; 370/542
(58) Field of Classification Search ... 370/389–395.52, 370/400–409, 419–424, 532–542; 359/118–126, 359/135–139, 152–158, 164–168, 180–195
See application file for complete search history.

(56) References Cited

U.S. PATENT DOCUMENTS

| 7,031,343 | B1 * | 4/2006 | Kuo et al. ............... 370/473 |
| 2002/0063924 | A1 * | 5/2002 | Kimbrough et al. ........ 359/125 |
| 2003/0142626 | A1 * | 7/2003 | Umayabashi et al. ..... 370/236.2 |
| 2003/0236916 | A1 * | 12/2003 | Adcox et al. ............... 709/245 |

* cited by examiner

Primary Examiner—Chi Pham
Assistant Examiner—Thai Hoang
(74) Attorney, Agent, or Firm—Blakely, Sokoloff, Taylor & Zafman

(57) ABSTRACT

A MAC master apparatus for executing a multi-point control protocol (MPCP) data in an optical line termination (OLT) of an Ethernet passive optical network (PON) is provided. The MPCP master apparatus includes a CPU interface unit, two or more memory arbitration control units, a SGA table memory, a RTT table memory, a static grant generation unit, a dynamic grant generation unit, a static grant queue, a dynamic grant queue, a sending message queue, a sending multiplexing unit, a time setting unit, a receiving window generation unit, an upstream grant queue, a received demultiplexing unit, a report queue and a received message queue. Therefore, any frame, including MPCP frames from/to the CPU can be sent or received, and a grant can be allocated statically according to a setting or dynamically according to a report from the ONUs.

10 Claims, 7 Drawing Sheets

FIG. 6

| Action[3:0] | pointer [11:0] | LLID [15:0] |
|---|---|---|
| Duration[15:0] | | MAC_ADDR[47:32] |
| MAC_ADDR[31:0] | | |
| RESERVED | | |

FIG. 7

| RESERVED | LLID [15:0] |
|---|---|
| RESERVED | MAC_ADDR[47:32] |
| MAC_ADDR[31:0] | |
| Queue0 report | Queue1 report |
| Queue2 report | Queue3 report |
| Queue4 report | Queue5 report |
| Queue6 report | Queue7 report |
| RESERVED | |

APPARATUS FOR EXECUTING MULTI-POINT CONTROL PROTOCOL IN ETHERNET PASSIVE OPTICAL NETWORK

BACKGROUND OF THE INVENTION

This application claims priority from Korean Patent Application No. 2002-78147, filed on Dec. 10, 2002, in the Korean Intellectual Property Office, the disclosure of which is incorporated herein in its entirety by reference.

1. Field of the Invention

The present invention relates to a media access control (MAC) master for executing a multi-point control protocol (MPCP) in an Optical Line Termination (OLT) of an Ethernet Passive Optical Network (Ethernet PON).

2. Description of the Related Art

An Ethernet passive optical network (Ethernet PON) has been proposed to apply Ethernet having been generally used in a Local Area Network (LAN) to a general subscriber network.

FIG. 1 is a view showing the configuration of an Ethernet PON.

In an Ethernet PON, an Optical Line Termination (OLT) 110 interfaces the network and is passively connected to Optical Network Units (ONUs) 120a-120n. Through an optical splitter 130, the optical network units (ONUs) 120a-120n are each connected to individual subscriber sides.

An Ethernet PON differs from an asynchronous transfer mode passive optical network (ATM PON), by transmitting data in the format of an Ethernet frame. The Ethernet frame includes an 8-byte preamble with a logical link identification (LLID) field, for identifying the ONU.

In an Ethernet frame transported from the OLT to an ONU (hereinafter, called "downstream"), the LLID indicates the ONU receiving the Ethernet frame (LLID may include broadcast). In an Ethernet frame transported from an ONU to the OLT (hereinafter, called "upstream"), the LLID indicates the ONU transmitting the Ethernet frame.

FIGS. 2a and 2b are views of downstream and upstream traffic flows, respectively, in the Ethernet PON.

The downstream Ethernet frame is transmitted through optical fibers, divided into a plurality of sections by a passive splitter, and broadcasted to all ONUs. Each ONU checks the LLID information of the transmitted Ethernet frame and determines whether to accept the data based on the LLID information. For upstream traffic flow, each ONU transmits Ethernet frames upstream within its own allocated time period according to a grant signal provided by the OLT, so that the Ethernet frames sequentially reach the OLT without overlapping. The OLT checks the LLID information written on the preamble of the frame and recognizes the ONU that transmitted the Ethernet frame.

The multi-point control protocol (MPCP) is used to control PON transmission and satisfy the Ethernet MAC frame transmission standard of IEEE 802.3ah. An Ethernet PON defines and utilizes MPCP messages to perform functions associated with a PON. By using MPCP messages, ONU can be connected to the OLT, a grant signal for upstream data transmission can be transferred to the ONU or a report about the queue states of an ONU can be transferred to the OLT.

The MPCP messages are categorized into five types: a gate message from the OLT to an ONU regarding time and duration of a data transmission; a report message representing the sending queue state of an ONU, wherein the state represents an amount of data in the queue waiting to be transmitted; a register_req message that is sent to the OLT after initialization of an ONU, indicating a request for registration; a register message sent from the OLT to an ONU in response to the register_req message, containing an LLID value assigned to the ONU; and a register_ack message sent from an ONU to the OLT to confirm the contents of the register message.

A gate message is also used for transmission of report and general data by registered ONUs with LLIDs allocated thereto. The gate message is also used for the unregistered ONUs to send register_req message. This gate message is marked with a specific flag. And after the register message is sent downstream during the registration procedure, the OLT provides a gate message to the corresponding ONU so that the ONU can respond with a register_ack message.

When the OLT allocates the transmission time of an upstream Ethernet frame to each ONU, the OLT designates each ONU's transmission start time on the basis of Round Trip Time (RTT) measured from the OLT to each ONU. This time is designated, so that the Ethernet frames, including preamble and idle patterns, sent by different ONUs do not overlap at the moment of reaching the OLT due to any transmission latency of optical fibers or any processing latency. In order to accomplish this, both the OLT and ONU have timers. The ONU synchronizes its timer with the OLT timer by copying the timer value of the OLT included in the MPCP messages. The OLT detects RTT to each ONU, using the timer value included in an MPCP message transferred upstream. The ONU interprets transmission start time of the Ethernet frame by synchronizing the ONU timer with the OLT timer. Considering RTT to the ONU, the OLT controls the transmission start time of each ONU.

SUMMARY OF THE INVENTION

The present invention provides a media access control (MAC) master apparatus capable of reliably performing Ethernet Passive Optical Network (PON) communication.

A multi-point control protocol (MPCP) processing unit of the master apparatus is capable of sending and receiving an MPCP message related to ONU registration and a message frame related to Ethernet operation and management (OAM). Also, the MPCP processing unit transmits a static gate messages periodically for each ONU, using a provision information pre-set by an operator. In addition, the MPCP processing unit receives queue state reports from the ONUs, generates transmission time allocated to each ONU, and transmits a dynamic grant to each ONU. For such a grant allocation, it is required to designate transmission start time and transmission time period, considering RTT to each ONU. Also, it is necessary to provide a function for sending and receiving general data frames other than the MPCP frames.

According to an aspect of the present invention, there is provided a multi-point control protocol processing apparatus over an Ethernet Passive Optical Network (PON) including an Optical Line Termination (OLT) and an Optical Network Unit (ONU), the apparatus comprising: a CPU interface unit which connects to an external CPU, and receives and sends data from/to the external CPU; an SGA table memory which stores a plurality of static grant allocation information entries written therein, in a linked-list structure; a RTT table memory which stores RTT values for each LLID; a memory arbitration control unit which controls access of the SGA table memory and RTT table memory; a static grant generation unit which generates static grant frames periodically for each logical link identification (LLID) according to static grant generation information from the SGA table memory which was set by the CPU; a dynamic grant generation unit which reads grant request information, for data transmission process, from a report queue and generates the dynamic grant frames according to LLID and grant request information; a static grant queue which stores the static grant frames generated from the static grant generation unit; a dynamic grant queue which stores the dynamic grant frames generated from the dynamic grant generation unit; a sending message queue which stores sending message frames from the CPU; a sending multiplexing unit which receives and schedules sending request signals transmitted from an external PON bridge, the static grant queue, the dynamic grant queue and the sending message queue, wherein one signal is selected, and contents of a corresponding queue are output; a time setting unit which sets start time information of any passing grant frames, and transfers an Ethernet frame, output from the sending multiplexing unit, to a media access control (MAC) sending unit; a receiving demultiplexing unit which demultiplexes an Ethernet frame received from a MAC receiving unit; a report queue which stores report information received from the receiving demultiplexing unit; and a received message queue which stores Ethernet frames to be transferred from the receiving demultiplexing unit to the CPU.

According to another aspect of the present invention, there is provided a grant scheduling method in multi-point control protocol processing method over an Ethernet Passive Optical Network (PON) including an Optical Line Termination (OLT) and an Optical Network Unit (ONU), the grant scheduling method comprising: (a) determining the length of the grants separately for static and dynamic grants; (b) determining the start time of the grants after the static and dynamic grants are multiplexed; (c) subtracting the RTT value of the corresponding ONU from the start time, where in the step (b) further comprising of last scheduled time register which is incremented for each generated grant as much as the length of the grant and after this increment, becomes the start time of the following grant, and when there was not any grant for a predetermined time, so that the last scheduled time register has become a past value or it is not ahead of the current time enough by a predetermined time, the last scheduled time register is advanced to a future time with a predetermined minimum offset.

According to still another aspect of the present invention, there is provided a apparatus for IEEE 802.3ah based Ethernet PON OLT device, wherein when the register_req message was received for the first time from an ONU, the measured RTT value is overwritten to the FCS portion of the received frame and delivered to the CPU with the frame and the RTT value is written back to the RTT table later for the first normal grant transmission to the ONU after LLID assignment.

According to still yet another aspect of the present invention, there is provided a apparatus for IEEE 802.3ah based Ethernet PON OLT device, wherein the grant value contained in the gate message contains the priority of the grant, the priority indicating the ONU's queue number to be serviced by the grant.

BRIEF DESCRIPTION OF THE DRAWINGS

The above and other features and advantages of the present invention will become more apparent by describing in detail exemplary embodiments thereof with reference to the attached drawings in which:

FIG. 6 shows an example of an entry structure for a static grant allocation table; and FIG. 7 shows the data format of input to a report queue 475.

DETAILED DESCRIPTION OF THE INVENTION

Hereinafter, embodiments of the present invention will be described in detail with reference to the appended drawings.

Figure 1:
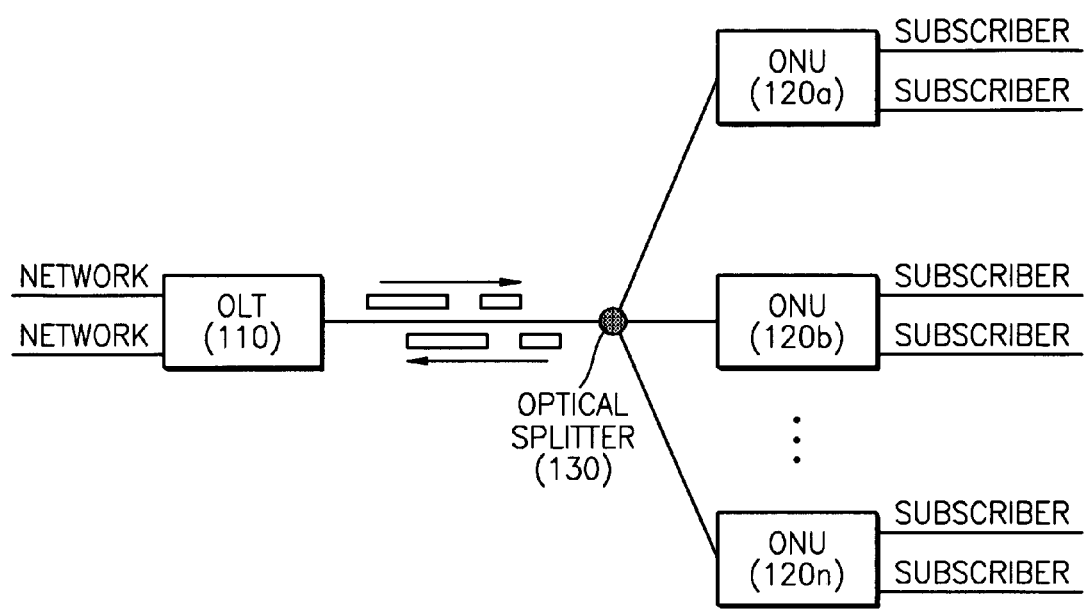
FIG. 1 is a view showing the configuration of an Ethernet passive optical network (Ethernet-PON)
Figure 2A:
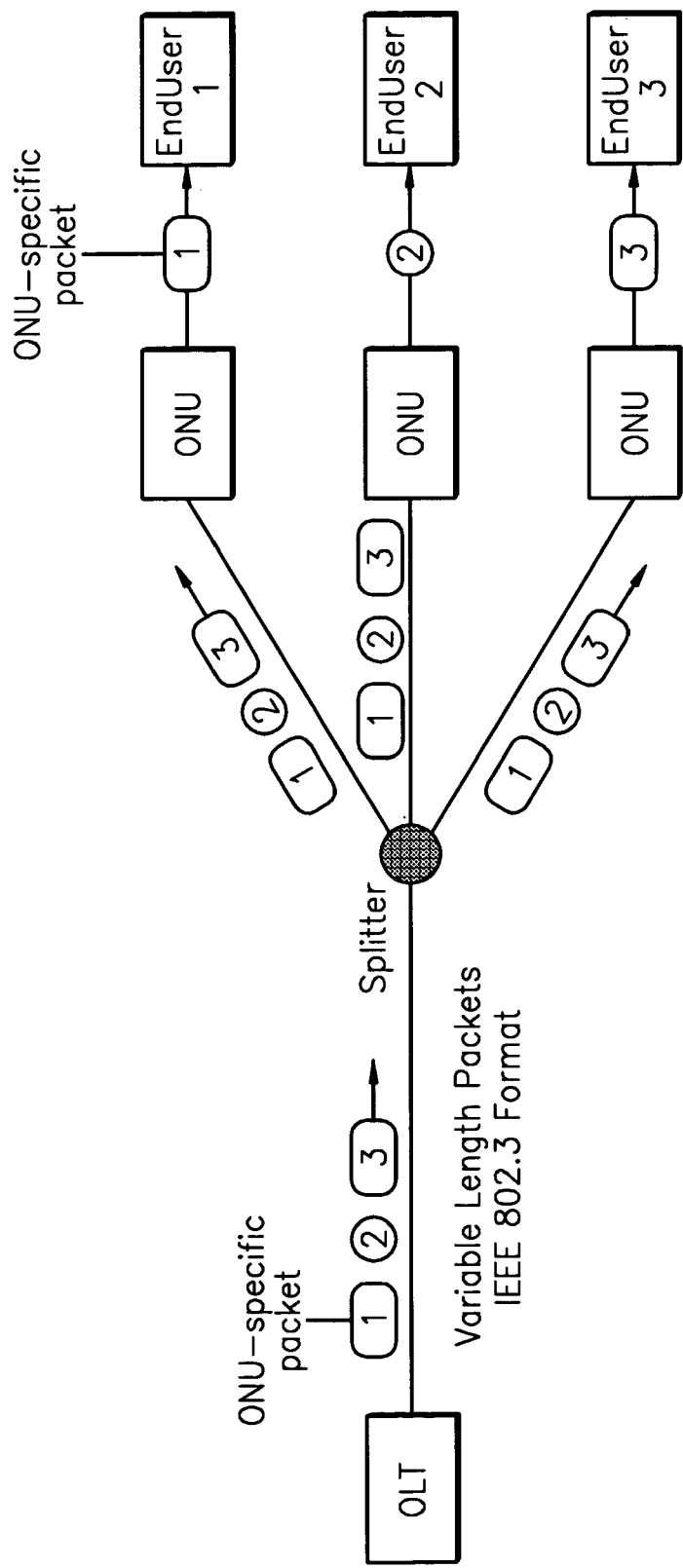
FIG. 2a is a view of the downstream traffic flow in an Ethernet PON.
Figure 2B:
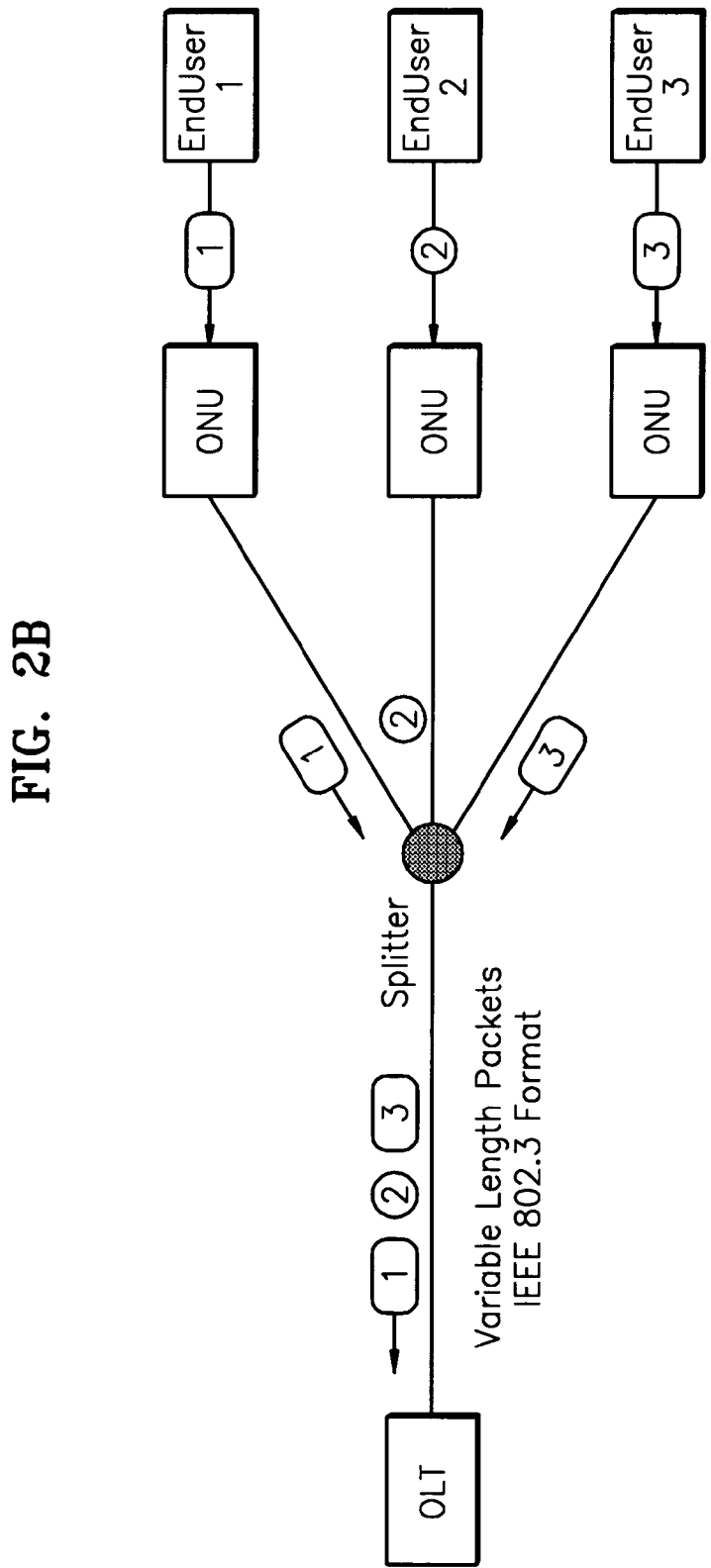
FIG. 2b is a view of the upstream traffic frame in an Ethernet PON.
Figure 3:
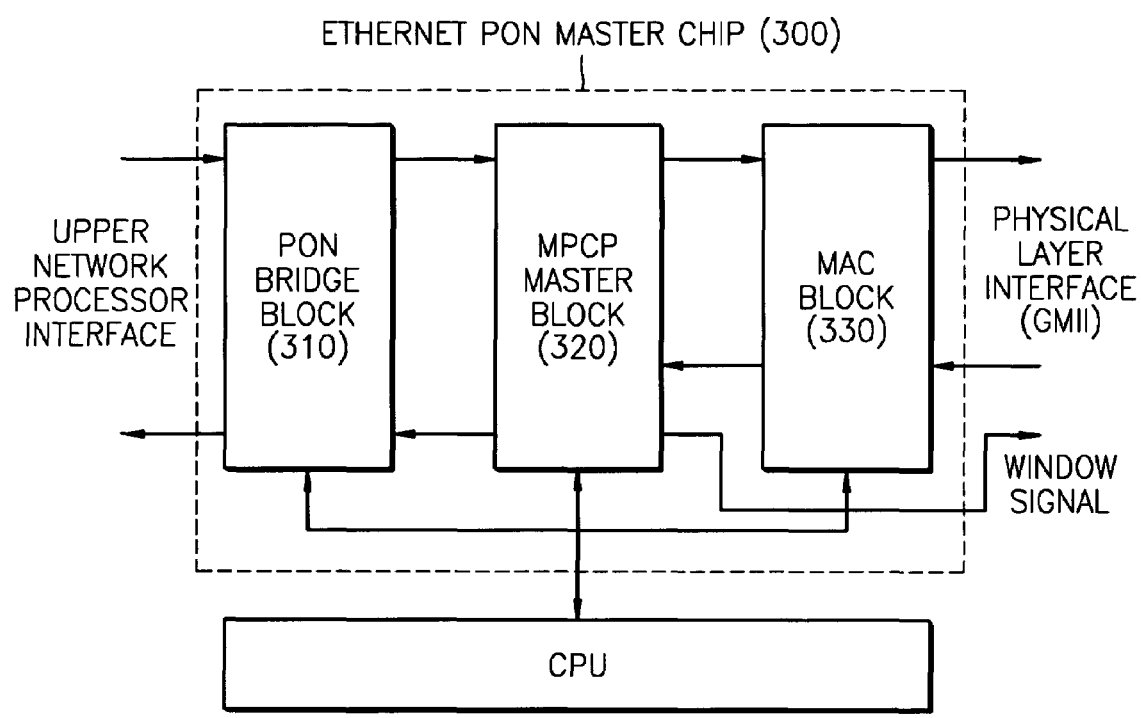
FIG. 3 is a block diagram of an Ethernet PON master chip.

FIG. 3 is a block diagram of an Ethernet Passive Optical Network (Ethernet PON) master chip.

Generally, an Ethernet PON master chip 300 includes, a PON bridge block 310 using LLID for controlling compatibility with an upper layer; an MPCP master block 320 for performing multiplexing and demultiplexing of frames, processing MPCP data, and processing grant scheduling and auto-discovery on each LLID; and a MAC block 330 for generating and checking a Frame Check Sequence (FCS) for all frames, and performing frame sending and frame receiving.

The PON bridge block 310 reads the LLID and the source address (SA) in an upstream Ethernet frame transferred from the MPCP master block 320, and detects an LLID of the source address. Also, the PON bridge block 310 checks the source address (SA) of a downstream Ethernet frame transferred from a network processor (NP) in the upper layer, and detects whether a corresponding MAC address is located at the network processor side. The statement, "in a case that a certain MAC frame is transferred downstream from the network processor, the source address (SA) of the MAC frame is a certain value" means that an end station having a corresponding MAC address is located at the network processor side, viewed from an Ethernet PON circuit.

The process of detecting whether end stations (objects with MAC addresses, e.g., PCs, Workstations, Routers, or bridges having an upper layer 3 processing entry) with certain MAC addresses are located at the network processor (NP) side or at an ONU corresponding to a certain LLID is called "source address learning". The process results in creation of an entry stored in a filtering database (FDB), where each entry being information stored in the filtering database (FDB) is automatically abolished if the source address (SA) is not found in the Ethernet PON during a predetermined time period. This process is called "aging".

In an Ethernet PON, an LLID has a 16-bit value and is allocated to a corresponding ONU by the OLT when an ONU registers. One ONU may have two or more LLIDs. According to operations, in a single Ethernet PON tree, thirty-two (32), sixty-four (64) or more LLID values may be used. The upper one bit of the 16-bit LLID can be used for representing an anti-LLID. This anti-LLID is used to specify an ONU exception when the Ethernet frame is transmitted downstream, and all ONUs are to receive the data, except for the ONU indicated in the LLID field of the anti-LLID value.

For example, if it is assumed that the most upper bit of the 16 bits is used as "anti", the '1000000000000111' value means that the Ethernet data is transmitted to all ONUs except for the ONU to which LLID 7 is allocated.

If the PON bridge block 310 receives an upstream Ethernet frame from the MPCP master block 320, the PON bridge block 310 checks the destination address (DA) value of the Ethernet frame and detects where the address is located in the filtering database. If the Ethernet frame is to be transferred to the network processor, the Ethernet frame is transferred without LLID. On the other hand, if the Ethernet frame is to be transferred to an ONU corresponding to a specified LLID, the LLID value of the received Ethernet frame is changed to the corresponding LLID and is transferred back to the MPCP master block 320 for transmission to ONU side.

If the destination address is not found in the filtering database, the Ethernet frame is simultaneously transferred to the network processor without an LLID and is transferred to the MPCP master block 320 with an anti-LLID value of the original LLID with which the frame was received. This process is the same as the conventional technique in which a bridge performs a flooding operation. In this case, source address learning is performed regardless of a destination address.

If the PON bridge block 310 receives a downstream Ethernet frame from the network processor, the PON bridge block 310 checks the DA value of the Ethernet frame and finds where the address is located in the filtering database. Then, if a valid ONU is identified, the Ethernet frame is transferred with LLID to the MPCP master block 320. If the frame is located in the network processor, the frame is abolished (according to a bridge standard, the frame should have been transferred to a corresponding MAC address pre-existing in the network processor side). Likewise, In this case, source address learning is once again performed, regardless of the destination address.

The MPCP master block 320 is located between the PON bridge block 310 and the MAC block 330, and sends and receives Ethernet frames with LLIDs. Some Ethernet frames with LLIDs (frames for an Ethernet PON) are generated or removed inside the MPCP master block 320.

The sending unit of the MPCP master block 320 multiplexes a downstream Ethernet frame, containing an LLID and received from the PON bridge block 310, a static grant frame generated periodically, a dynamic grant frame created by interpreting reports received from an ONU, and a frame transferred from the CPU. The multiplexed data is transferred to the MAC block 330. The frames output from the CPU include a grant frame for auto-discovery, register message, and a frame for OAM.

The receiving unit of the MPCP master block 320 receives an upstream Ethernet frame output from the MAC block 330. If the received frame is a report frame, the receiving unit processes the frame inside the MPCP master block 320. If the received frame is a register_req frame, or register_ack frame associated with the auto-discovery, or an OAM frame, the receiving unit transfers the frame to the CPU. If the received frame is general data, the receiving unit transfers it to the PON bridge block 310.

The MPCP master block 320 performs RTT update, grant generation, and timer transfer as follows:

(1) RTT Update

When the MPCP frame is received, the Round Trip Time (RTT) value of the LLID is determined by identifying the difference between the OLT timer value at the time the MPCP frame is received and the ONU timer value extracted from the received frame at that time. The determined RTT value is written into the RTT table. The RTT value of each LLID is stored as a separate RTT entry within the table memory (RTT table RAM), which is readable and writable by the CPU. The RTT table memory updates the RTT value of an LLID when the receiving unit receives an MPCP message. When the sending unit sends a frame containing the LLID, transmission start time of a grant is subtracted by the RTT value of an LLID.

(2) Grant Generation

When a static grant and dynamic grant are generated first inside the MPCP master block, only the grant length is calculated. Transmission start time of the grant is determined while the static grant, the dynamic grant, and a grant from the CPU are selectively transmitted. In other words, all the above signals are multiplexed and the transmission start times of the grants are determined in the time-setting unit. Before the grant is transmitted and after the start time of the grant is determined, the grant is transmitted after the length thereof is reduced by a RTT value corresponding to the destination ONU. The reduction removes the difference between the arrival times of the Ethernet frames due to RTTs. Since the start time of the grant is reduced beforehand by the RTT value, the arriving time for the received frames are aligned as predetermined before RTT compensation, regardless of RTT.

When an ONU transmits an Ethernet frame, the Ethernet frame is sent in advance by each RTT according to a transmission distance and therefore reaches the OLT at an originally scheduled transmission start time. When a grant message is created, an Ethernet frame contains a corresponding LLID in the header. The corresponding LLID is the grant message. A gate message is transmitted to a specified ONU, according to a specific LLID. All frames sent to an ONU in an Ethernet PON include LLID fields in the header, describing the destination ONU. An upstream frame contains the LLID of the source ONU.

When a gate message for auto-registration is sent, a frame including a broadcast LLID is transferred downstream. The register message, used when an LLID is allocated to an ONU, also includes the broadcast LLID and is transmitted downstream. The broadcast LLID is used because the ONU has not yet received an assigned LLID at the moment of receiving the register message.

(3) Timer Transfer

When all MPCP frames are sent, an OLT timer value within the MPCP master block 320 is loaded in the MPCP frame and is sent, thereby allowing each ONU to synchronize its own timer value with the timer value of the OLT.

When sending an Ethernet frame, the MAC block 330 receives an Ethernet frame from MPCP master block 320, performs Cyclic Redundancy Check (CRC) and inserts the calculated result into the Ethernet frame. Also, when receiving an Ethernet frame, the MAC block 330 performs CRC, and transfers the calculated result to the MPCP master block 320 if no error is found. When the MAC block 330 receives the Ethernet frame, the MAC block 330 checks a destination MAC address and determines whether the Ethernet frame is to be received or not. Also, the MAC block 330 manages a counter for Management Information Base (MIB) on each LLID. The MAC block 330 also performs conversion between 32-bits and 8-bits. Since a Gigabit Media Independent Interface (GMII), which is an 8-bit interface, is effective with respect to speed when it is processed internally at a 32-bit rate, the MAC block 330 performs the conversion in such a manner that it performs 32-bit processing internally and performs 8-bit processing for external interfaces.

Figure 4:
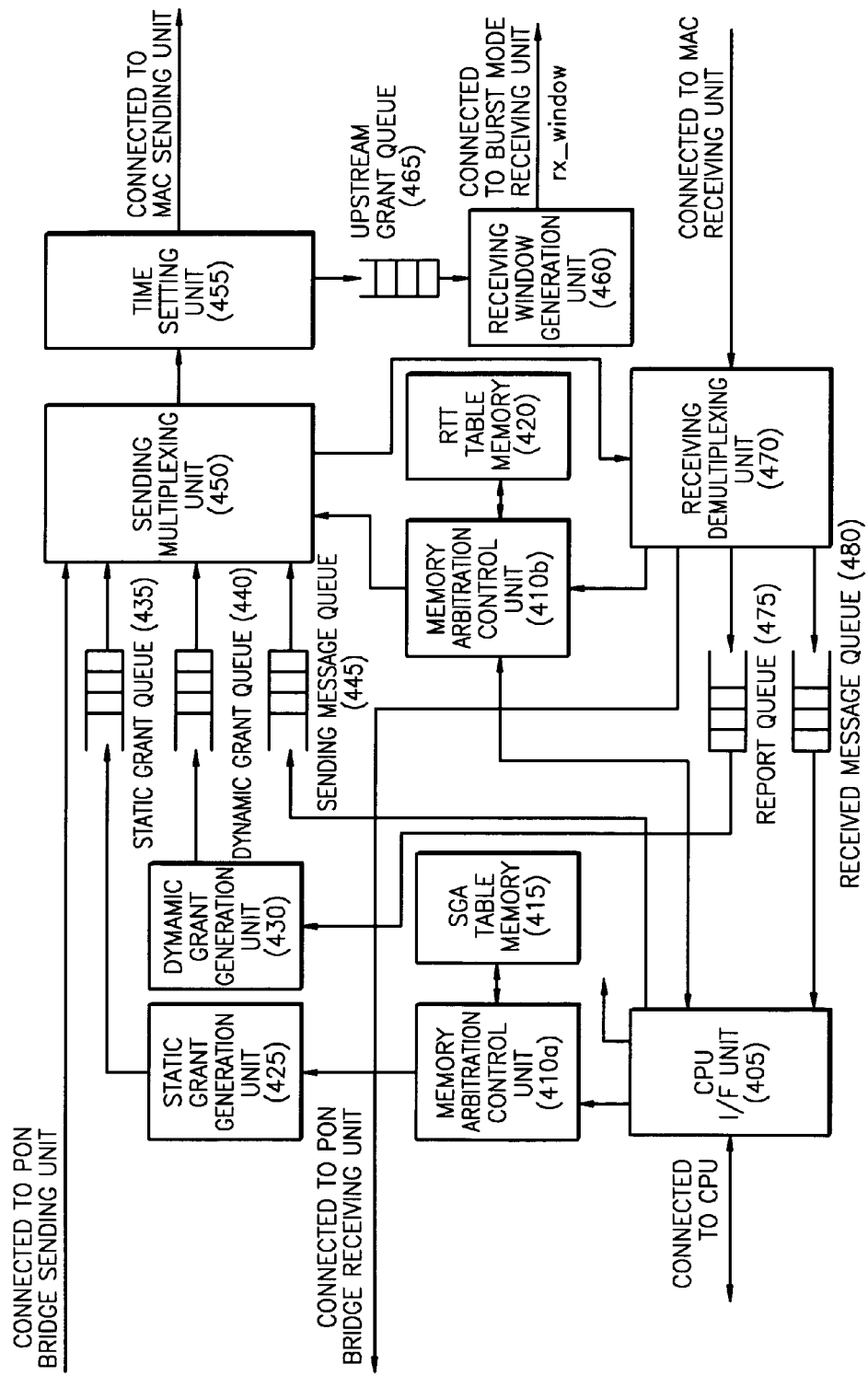
FIG. 4 is a detailed block diagram of an MPCP master block.

Now, the MPCP master block 320 of the present invention will be described in detail with reference to FIG. 4.

The MPCP master block 320 includes a CPU interface unit 405, a memory arbitration control unit 410a and 410b, SGA table memory 415, RTT table memory 420, a static grant generation unit 425, a dynamic grant generation unit 430, a static grant queue 435, a dynamic grant queue 440, a sending message queue 445, a sending multiplexing unit 450, a time setting unit 455, a receiving window generating unit 460, a upstream grant queue 465, a receiving demultiplexing unit 470, a report queue 475, and a received message queue 480.

The CPU interface unit 405 allows an external CPU to interface the Ethernet PON master chip, according to the external bus standard PowerPC405. The CPU interface unit 405 has a flag-setting and flag-clearing function for interrupt processing and performs a reading and writing function of data from/to the static grant allocation and RTT table memories using memory arbitration. To access the static and RTT table memories, the CPU sets up and triggers information required for reading or writing data from/to the table, and then the CPU interface unit 405 reads and writes data from/to the memory address determined according to the set-up information.

Access to memories storing the static grant allocation and RTT tables may be performed on a desired burst length. During the write operation, set-up data is written to the set-up data registers and written to the memory in a burst, and during the read operation, data is read from the memory in a burst and stored in a separate data registers for CPU access. A single address can be accessed, or many addresses can be sequentially accessed. Through the CPU interface unit 405, the CPU can read and write data from/to the SGA table memory 415 and RTT table memory 420. Particularly, through the CPU interface unit 405, the CPU can write frame data to the sending message queue 445 to send arbitrary frame or it can read frame data which was received and stored in the receive message queue. For example, the gate message and register message for auto-registering are not data created and sent from separate hardware, but created and sent from the CPU, whereas the static gate message and dynamic gate message are data created and sent from independent hardware.

The memory arbitration control units 410a and 410b control access to the SGA table memory 415 and RTT table memory 420, respectively, so that a plurality of function blocks can read and write data from/to the same memory. The Memory accesses are performed on synchronization with a clock (31.25 MHz, 125 MHz/4) of the sending unit of the MPCP master block 320. The synchronization process with the clock of the sending unit of the MPCP master block 320 is performed in advance so that the CPU can read/write data from/to the SGA table or RTT table memory.

As described above, the CPU operations for reading and writing data from/to memory are performed through a processor inside the CPU interface unit 405. In the sending unit of the MPCP master block 320, the CPU reads the contents of the SGA table memory 415 or the contents of the RTT table memory 420. The clock of the sending unit of the MPCP master block 320 is used and accordingly a separate synchronization process is not necessary.

The memory arbitration control unit 410a allows the CPU to read and write data from/to the SGA table memory 415. Also, when general data is processed, the data is read from the static grant generation unit 425 of the sending unit. This is because the gate message should periodically be transferred to an ONU for upstream frame transmission. The SGA table is periodically read to support this functionality. Also, the memory arbitration control unit 410b allows the CPU to read and write data from/to the RTT table memory 420. During the reading/writing, the RTT table memory 420 is used for updating RTT values of each LLID in the receiving demultiplexing unit 470, and is read in order to subtract the RTT value of each LLID in the time setting unit 455.

As described above, since memory could be read or written by two or more function blocks, the memory arbitration control unit is required. Wherein the memory arbitration control unit performs the reading or writing by processing reading and writing arbitrations from/to a dual port memory therein. An interface between the memory arbitration control unit and function blocks is shown in FIG. 5.

Figure 5:
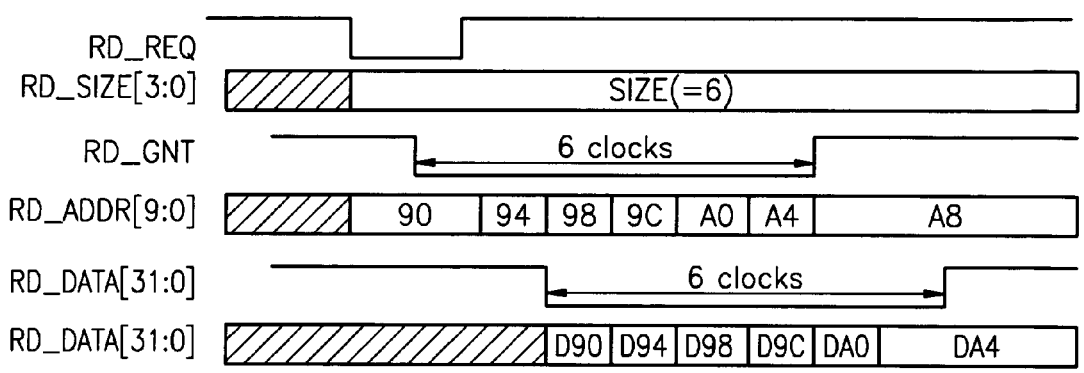
FIG. 5 shows interface signals of a memory arbitration unit.
Figure 5:
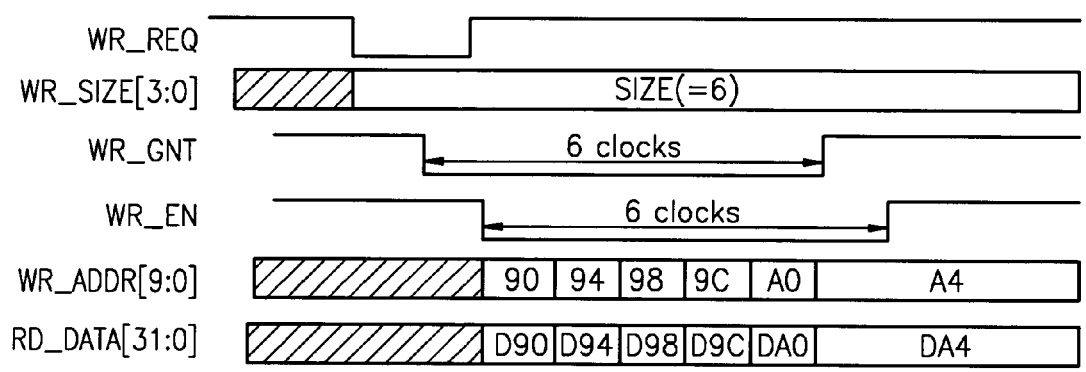

FIG. 5 shows interface signals of the memory arbitration control unit.

In the case of the reading process, the memory arbitration control unit sends a whole required grant to a selected block, receives an address to be read during this grant interval, reads corresponding data from memory, and transfers the read data with an enable signal to the requiring block. In the case of the writing process, the memory arbitration control unit sends a whole required grant to the selected block, receives an address and data with an enable signal, and writes them to memory.

SGA table memory 415 has values for each entry, in the format shown in FIG. 6. These entries are connected using a linked list with pointers.

FIG. 6 shows an example of an entry configuration for the static grant allocation table.

This list is scanned at predetermined periods to generate a static grant. By using a linked-list structure, the addition and deletion of entries can be easily performed. In FIG. 6, static table memory has a width of 32 bits.

The meaning of each field in the static grant allocation table will be described hereinafter along with the static grant generation unit 425.

The static grant generation unit 425 reads the linked list of entries stored in the static table memory at the predetermined periods and generates a grant based on an action of the operation instruction space. Then, the static grant generation unit 425 reads the next entry according to a pointer and creates a grant frame according to LLIDs, durations, and destination addresses (DA) of the next entry. The action of the operation instruction space includes information about whether a grant for the corresponding entry is to be generated. The pointer indicates the location of the next entry. The entry has four words, consisting of 32 bits, as one unit, and thus has an entry size of 0×20. If a pointer value is "0", the static grant generation unit 425 regards it as the final entry of the linked-list and waits for the beginning of the next period.

The grant is represented as a length and a start time. The static grant generation unit 425 and the dynamic grant generation unit 430 calculate only the length of the grant. The start time is determined and sent by the time setting unit 455. In a practical circuit, the start time of the grant is inserted into a designated location just before the grant is transferred. When the length of the static grant is created and transferred, it is sent after an idle period (AGC setting time+CDR lock time), which is set by the CPU is added to the length of the grant. The AGC setting time is automatic gain control time required for detecting a threshold value of an optical signal in an optical receiver of the OLT. CDR lock time is clock and data recovery time for recovering clock and data after restoring an electric signal in the OLT.

The same constant laser turn-on time (time for ONU to turn-on laser) and laser turn-off time (time for ONU to turn-off laser) are used for each ONU and are also added to the length of the grant for each generated gate. The processing times or transfer latencies of ONUs are different from each other. Compensation is achieved by subtracting different values for respective LLIDs when the RTT values are sent.

The dynamic grant generation unit 430 reads unit data in the report queue 475 and generates a grant frame for an LLID requiring a grant. Only information required for generating a dynamic grant is written on the report queue 475. The unit data is written on the report queue 475 when one report frame is received. If the last scheduled time for the future is too far apart from the current time, that means that the excessive upstream scheduling(upstream congestion) occurred and in that case, the dynamic grant generation unit 430 can not give a whole grant length requested by the ONU. In that case, the dynamic grant generation unit 430 calculates and transfers downstream giving weight to high priority queue requests according to a predetermined algorithm. The scheduling is performed for the future time. When an ONU receives a gate message, a little time margin should be provided before the time to write in the gate.

When the dynamic grant allocation unit provides the dynamic grant length, 64 bytes and an idle period (AGC setting time+CDR lock time) set in the CPU are added to the length. The 64 bytes are added so that state information of the queue can be transferred upstream just after data is sent. Also, the time for turning on laser and turning off laser, and OLT's AGC time and CDR lock time are added to the gate length Because those were not included in the queue report.

The static grant queue 435 stores the generated static grant frame, the dynamic grant queue 440 stores the dynamic grant frame and the sending message queue 445 stores the message frame transferred from the CPU. If frames awaiting transmission exist in the respective queues, a transmission request is sent from each frame to the sending multiplexing unit 450. The frame is transferred when the sending multiplexing unit 450 receives a signal requiring it to be read.

The sending multiplexing unit 450 receives frame transmission requests from the static grant queue 435, the dynamic grant queue 440, the sending message queue 445, and the data queue of the PON bridge block 310. The sending multiplexing unit 450 selects one, reads Ethernet frame data within the selected queue, and transfers it to the time setting unit 455. Transfer priorities are determined on the basis of queue state information from the data queue of the PON bridge block and the downstream Ethernet frame transmission record of each LLID stored in the sending multiplexing unit 450. The Ethernet frame is transmitted, but can not exceed an average bandwidth predetermined for a specific LLID.

A queue corresponding to a specific LLID is read by sending the LLID value to the PON bridge block. Such multiplexing is performed for the static grant queue 435, the dynamic grant queue 440, the sending message queue 445, and the PON bridge queue. This multiplexing also performs the function of inserting a 96-bit time interval corresponding to an inter-frame gap while scheduling. In the case of processing data per 32 bits, the time interval corresponding to the 96-bits is 3 clocks.

The time setting unit 455 receives the Ethernet PON frame data from the sending multiplexing unit 450 and transfers the data to the MAC block, wherein the Ethernet PON frame may be general data transmitted from a network processor, or may be MPCP frame data created in the CPU or the Ethernet PON master. If the transmission data is MPCP frame data, a timer value of OLT is inserted, and if the transmission data is the grant frame, transmission start time is determined and inserted. The start time value should be inserted after subtracting the RTT value of the LLID processed from the start time value. After obtaining a RTT value from the RTT table, if the data is grant frame data, a value is obtained by subtracting the RTT value from the predetermined grant start time, and inserted.

Some amount of time is taken to read the RTT table (this time amount is not a fixed value and may be long because waiting time is required until CPU has completed reading if the CPU is reading the RTT table). The sending multiplexing unit delays sending data to the MAC layer for enough time to read the RTT table so that the delayed time can be used for reading the RTT table and subtracting the RTT value. If an RTT value is not obtained after the delayed time period, a notice indicating that no RTT value could be obtained is sent to the CPU through an interrupt.

The waiting time is predetermined as 10 clocks, but can be modified. The time setting unit 455 includes a last scheduled time (LST) register, which stores information regarding the time at which a new grant can be started after a previous grant is finally allocated. The start time of the new grant is generally LST, the LST value is increased by a grant length and indicates more future time. Accordingly, a new LST value is the value of current LST added to the newly allocated grant length, temporarily becoming the more future time.

The newly allocated grant length is added to the current LST value to make the new LST. As the newly allocated grant length is added, AGC of the OLT, CDR lock time, and laser turn-on/turn-off time of an ONU are further added. The laser turn-on/turn-off time of an ONU may be a constant for all ONUs, or for each ONU, it may be any values written to the RTT table as described above.

When determining the start time of a new grant, if the LST value is earlier than the current timer value or is not later (future value) by a predetermined offset since no grant is allocated for a long time, the grant start time is set after the LST value is unconditionally set to current time+offset. When the ONU receives the value obtained by subtracting RTT value from the start time value, the start time of the grant should be always later than the current time by some amount, ensuring the grant start time of the ONU will be a future value, not a past value.

The time setting unit 455 sends a length and start time value of grants to the receiving window generation unit 460 whenever the grants are allocated. At this time, the start time is the value before subtracting the RTT value therefrom. A value is obtained by subtracting the processing latency from the burst optical receiver of OLT to the point where the timer value is extracted, from the start time to be sent to the receiving window generation unit 460, and is written to the upstream grant queue 465.

The upstream grant queue 465 stores the grant information sent by the OLT to the plurality of ONUs. This stored information is information for estimated arrival times of upstream frames corresponding to each grant, seen at the burst mode optical receiver.

The receiving window generation unit 460 reads grant information already transmitted to ONUs from the upstream grant queue 465, which is the expectation time at which the upstream frame reaches the OLT, and provides the expectation time to the burst mode receiving apparatus of the OLT. The receiving window generation unit 460 confirms the stored start time in advance, waits for transmission according to the specified time, and outputs the signal "1" for the grant length period if the MPCP timer value of the OLT is equal to the pre-confirmed start time. Then, the receiving window generation unit 460 reads the next grant value in advance just before the grant has ended and generates the next grant window using the method described above.

The receiving demultiplexing unit 470 checks the Ethernet frame transferred from the MAC block and transfers it to the correct destination. The register_req and register_ack frames among the MPCP frames are transferred to the received message queue 480 for delivery to the CPU, and the report frames are transferred to the receiving report queue. The remaining general data is transferred to the PON bridge.

Even though the destination address (DA) value of the Ethernet frame transferred from the MAC block is its own MAC address, the Ethernet frame is selectively transferred to the CPU (the Ethernet frame may be transferred to the network processor for upper protocol processing). When an OAM frame is received, the Ethernet frame is also transferred to the CPU. All the remaining frames are transferred to the network processor.

By subtracting the extracted timer value from the current time for all the received MPCP frames, the RTT value is calculated. The value is then newly written at an LLID location of the RTT table. This RTT value update is not performed when the register_req message is received, and the RTT value is written over the FCS portion of the frame to transfer to the CPU instead. Since an LLID is not yet allocated when the register_req message is received, the RTT can not be updated, after the register_req message is provided, a start time should be given considering the RTT of a corresponding LLID when a data grant for register_ack is given.

If the receiving demultiplexing unit 470 receives the register_req message, writes the calculated RTT value over the FCS portion, and sends the resulting value to the CPU, then the CPU reads the resulting value, temporarily allocates an LLID to the value and then writes the value to a location of the RTT table corresponding to the LLID. Laser turn-on time and turn-off time for a corresponding ONU are written thereto together. After the LLID is allocated to the ONU, the receiving demultiplexing unit performs the update processing automatically, since general frames are input with LLID.

The report queue 475 stores the received report information, and the receiving demultiplexing unit 465 extracts the LLID and queue length. In the case when the report frame of the MPCP message is received, the demultiplexing unit 465 stores the LLID and queue length in the report queue 475.

FIG. 7 shows the data format input to the report queue 475.

The received message queue 480 stores frames to be transferred to the CPU. The receiving demultiplexing unit 470 writes a corresponding frame to the received message queue 400. The frame is then read by the CPU.

As described above, according to the present invention, it is possible to effectively achieve effective MPCP functionality in an Ethernet PON. Particularly, it is possible to receive or send frame data including an MPCP frame from/to the CPU, and statically allocate a grant according to a specified setting or dynamically allocate a grant according to the reports from ONUs. Also, the grant allocation is simply scheduled by setting only a length of the grant in the first step, setting the grant start time in the second step, and compensating with the RTT value later. Also, most functions can be processed without separate software by updating the RTT on each LLID.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-point control protocol processing apparatus over an Ethernet Passive Optical Network (PON) including an Optical Line Termination (OLT) and an Optical Network Unit (ONU), the apparatus comprising:
   a CPU interface unit which connects to an external CPU, and receives and sends data from/to the external CPU;
   static gate allocation (SGA) table memory which stores a plurality of static grant allocation information entries;
   a round trip time (RTT) table memory which stores RTT values for each logical link identification (LLID);
   a memory arbitration control unit which controls access of the SGA table memory and RTT table memory;
   a static grant generation unit which generates static grant frames for each (LLID) according to static grant generation information from the SGA table memory which was set by the CPU;
   a dynamic grant generation unit which reads grant request information, for data transmission process, from a report queue and generates dynamic grant frames according to LLID and grant request information;
   a static grant queue which stores the static grant frames;
   a dynamic grant queue which stores the dynamic grant frames;
   a sending message queue which stores sending message frames from the CPU;
   a sending multiplexing unit which receives and schedules sending requirement signals transmitted from an external PON bridge, the static grant queue, the dynamic grant queue and the sending message queue, wherein one signal is selected, and contents of a corresponding queue are output;
   a time setting unit which sets start time information of any passing grant frames, and transfers an Ethernet frame, output from the sending multiplexing unit, to a media access control (MAC) sending unit;
   a receiving demultiplexing unit which demultiplexes an Ethernet frame received from a MAC receiving unit;
   a report queue which stores report information received from the receiving demultiplexing unit; and
   a received message queue which stores Ethernet frames to be transferred from the receiving demultiplexing unit to the CPU.

2. The apparatus of claim 1, further comprising:
   an upstream grant queue which stores grant information transmitted to the ONU; and
   a receiving window generation unit which reads transmitted grant information from the upstream grant queue to the ONU, and calculates an expectation time at which a frame transmitted from the ONU reaches the OLT.

3. The apparatus of claim 1, wherein in the sending multiplexing unit, the sending requirement signal transmitted from the external PON bridge includes length information of an Ethernet frame.

4. The apparatus of claim 1, wherein the static grant frame includes a LLID, a MAC address and grant length information.

5. The apparatus of claim 1, wherein the static grant generation unit reads a linked list of entries stored in SGA table memory, at predetermined time periods, to generate a grant as indicated by an operation instruction space, and reads a next entry, according to a pointer, to create a grant frame including a LLID, a duration, and a destination address (DA) on the basis of entry information.

6. The apparatus of claim 1, wherein the dynamic grant generation unit always sets grant start time to a later time, by a predetermined offset, than current time.

7. A grant scheduling method in a multi-point control protocol (MPCP) processing method over an Ethernet Passive Optical Network (PON) including an Optical Line Termination (OLT) and an Optical Network Unit (ONU), the method of grant scheduling comprising:
   (a) determining a length of grants separately for static and dynamic grants;
   (b) determining a start time of the grants after the static and dynamic grants are multiplexed;
   (c) subtracting a round trip time (RIT) value of the corresponding ONU from the start time, and
   (d) scheduling the grants based on the length of the grants and the start time of the grants, and sending the grants to the ONUs,
   wherein the step (b) further comprising a last scheduled time register which is incremented for each generated grant as much as the length of the grant and after this increment, becomes the start time of the following grant, and when there no scheduled grants occur for a predetermined time, and the last scheduled time register is a past value or the last scheduled time register is not sufficiently ahead of the current time by a predetermined time, the last scheduled time register is advanced to a future time with a predetermined minimum offset.

8. The method of claim 7, wherein when the last scheduled time register is advanced more than the current timer by more than a predetermined amount of time, the scheduler determines that there has been too many grant requests from the ONUs and reduces the amount of grant assignments resulting in grants shorter than requested values.

9. The apparatus of claim 1, the Ethernet PON OLT device is for a IEEE 802.3ah based Ethernet PON OLT device, wherein when a register_req message is received for a first time from the ONU, the measured RTT value is overwritten to a frame check sequence (FCS) portion of the received frame and delivered to the CPU with the frame and the RTT value is written back to the RTT table later for a first normal grant transmission to the ONU after LLID assignment.

10. The apparatus of claim 9, wherein a grant value contained in a gate message contains a priority of a grant, the priority indicating the ONU's queue number to be serviced by the grant.

* * * * *